United States Patent Office 3,598,824
Patented Aug. 10, 1971

3,598,824
7H-PYRROLO 2,3-d PYRIMIDINE-5-ACETIMIDATES
Franz Troxler, Bottmingen, and Gerhard Bormann, Basel, Switzerland, assignors to Sandoz Ltd. (also known as Sandoz AG), Basel, Switzerland
No Drawing. Filed July 15, 1969, Ser. No. 841,959
Claims priority, application Switzerland, July 23, 1968, 11,048/68
Int. Cl. C07d 57/14
U.S. Cl. 260—256.4
2 Claims

ABSTRACT OF THE DISCLOSURE

Compounds of the formula:

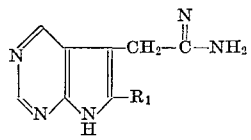

wherein $R_1$ is hydrogen or methyl, and the acid addition salts thereof.

The compounds possess strong ganglia-stimulating properties.

---

The present invention relates to new pyrrolopyrimidine derivatives of general Formula I.

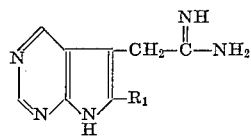      I in which $R_1$ signifies hydrogen or a methyl radical, and acid addition salts thereof. The invention extends to the production of these new compounds and acid addition salts thereof as well as to pharmaceutical preparations incorporating such compounds.

A compound of general Formula I and an acid addition salt thereof may be produced in accordance with the invention by reacting an imino ether of general Formula II,

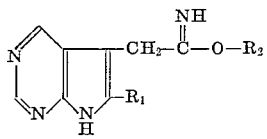      II in which
$R_1$ has the above significance, and
$R_2$ signifies a straight chain lower alkyl radical of 1 to 4 carbon atoms, with ammonia, and where an acid addition salt is required, converting the resulting compound into such salt.

The process of the invention may, for example, be effected by dissolving an acid addition salt of a compound of general Formula II in an organic solvent which is inert under the reaction conditions, e.g. a lower alkanol such as ethanol, adding an excess of ammonia, e.g. in liquid form, to the resulting solution or suspension conveniently with cooling and stirring, and subsequently allowing the mixture to stand at room temperature, e.g. for 3 hours, preferably with stirring. The resulting compound of general Formula I may be isolated from the reaction mixture and purified in the form of an acid addition salt or as free base in manner known per se.

The pyrrolopyrimidine derivatives of general Formula I produced in accordance with the invention are basic compounds and with inorganic acids, e.g. hydrogen chloride, hydrogen bromide or sulphuric acid, or with organic acids, such as oxalic, fumaric, maleic, tartaric, benzoic, methane-, ethane- or p-toluenesulphonic acid, or N-cyclohexylsulphamic acid, form stable salts which are usually water-soluble.

The compounds of Formula I and pharmaceutically acceptable acid addition salts thereof are useful because they possess pharmacological activity in animals. In particular, the compounds are useful ganglia stimulators as indicated by their properties in producing a dose-dependent increase of blood pressure and heart-beat frequency in narcotized dogs, and as also indicated by their properties in leading to nictitating membrane contraction and hypertension in spinal cats. In view of the said ganglia stimulating properties, the compounds may be employed in the treatment of nicotine addiction.

For the above-mentioned use, the dosage administered will, of course, vary depending upon the compound employed, the mode of administration and the treatment desired. However, in general, satisfactory results are obtained when administered at a daily dose of from about 0.01 to about 6 milligrams per kilogram of animal body weight. For the larger mammals, the total daily dosage ranges from about 10 milligrams to about 400 milligrams of the compound admixed with a solid or liquid pharmaceutical carrier or diluent.

The compounds of general Formula I or their water-soluble, physiologically tolerable acid addition salts may be used as medicaments on their own or in the form of appropriate medicina preparations, e.g. tablets, dragées, suppositories or injectable solutions, for enteral or parenteral administration. Aside from the usual inorganic or organic, pharmacologically inert adjuvants, e.g. lactose, starch, talcum, stearic acid, water, alcohols, natural or hardened oils and waxes, these preparations may also contain suitable preserving, stabilizing or wetting agents, solubilizers, sweetening or colouring substances and flavourings.

The hitherto unknown imino ethers of general Formula II, used as starting materials, are also included in the scope of the present invention and may be produced by reacting a nitrile of general Formula III,

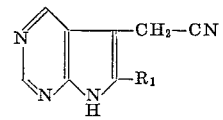      III in which $R_1$ has the above significance, with a lower alkanol of the general formula $R_2OH$, in which $R_2$ has the above significance, in the presence of an acid and under anhydrous conditions.

The production of the imino ethers of the general Formula II may, for example, be effected as follows:

A nitrile of general Formula III, e.g. 5-cyanomethyl-6-methyl-7H-pyrrolo[2,3-d]pyrimidine, is dissolved in an anhydrous lower alkanol of general formula $R_2$—OH, e.g. absolute ethanol, and an anhydrous organic solvent which is inert under the reaction conditions, e.g. a halogenated lower alkane, e.g. methylene chloride, is optionally added. An anhydrous strong acid is subsequently added to the resulting solution in the cold, e.g. at a temperature of about 0°; dried hydrogen chloride gas is preferably added to the solution which has been cooled to about 0° for an extended period, e.g. 8 hours, while stirring. The resulting acid addition salt of the imino ether of general Formula II, e.g. 5-(2-ethoxy-2-iminoethyl)-6-methyl-7H-pyrrolo-[2,3-d]pyrimidine hydrochloride, is usually obtained in the form of a precipitate, which is filtered off and thoroughly washed, e.g. with the solvent used above.

The resulting intermediate is preferably immediately converted into the corresponding compound of general Formula II with ammonia without previous purification.

The cyano compounds of general Formula III may, for example, be produced as follows:

A hydroxy compound of general Formula IV

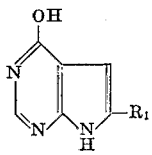
IV in which $R_1$ has the above significance, is converted into the corresponding chloro derivative, e.g. by heating with phosphorus oxychloride, and the chloro derivative is reductively dehalogenated, preferably with hydrogen gas, in the presence of a palladium catalyst at room temperature and at a slightly elevated pressure.

The resulting compound of general Formula V

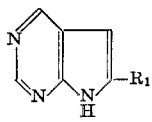
V in which $R_1$ has the above significance, is then reacted with formaldehyde and an amine of general Formula VI

VI in which each of $R_3$ and $R_4$ signifies lower alkyl, or $R_3$ and $R_4$ together signify a lower alkylene radical, under the conditions of a Mannich reaction, to give a compound of general Formula VII

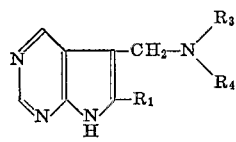
VII in which $R_1$, $R_3$ and $R_4$ have the above significance, this is heated with an alkali cyanide, e.g. sodium cyanide, in an acid aqueous solution, e.g. dilute hydrochloric acid, to yield a cyano compound of general Formula III.

Insofar as the production of the required starting materials is not described, these are known or may be produced in accordance with known processes or in a manner analogous to the processes described herein or to known processes.

In the following non-limitative example, all temperatures are indicated in degree centigrade and are uncorrected.

EXAMPLE 1

5-amidinomethyl-6-methyl-7H-pyrrolo[2,3-d]pyrimidine 24 g. of 5-cyanomethyl-6-methyl-7H-pyrrolo[2,3-d]pyrimidine are dissolved in 200 cc. of absolute ethanol and 400 cc. of methylene chloride, and dried hydrogen chloride gas is passed through the solution at 0° while stirring for 8 hours. The 5-(2-ethoxy-2-iminoethyl)-6-methyl-7H-pyrrolo[2,3-d]pyrimidine dihydrochloride obtained as a precipitate is filtered off, is thoroughly washed with methylene chloride and immediately suspended in 500 cc. of ethanol. About 200 cc. of liquid ammonia are introduced into this suspension while stirring and cooling slightly, the mixture is further stirred for 3 hours at room temperature and the precipitate is filtered off. The resulting 5-amidinomethyl-6-methyl-7H-pyrrolo[2,3 - d]pyrimidine monohydrochloride is treated with a solution of hydrogen chloride in ether to give the dihydrochloride which has a M.P. of 304–306°.

The 5-cyanomethyl-6-methyl-7H-pyrrolo[2,3-d]pyrimidine, used as starting material, may, for example, be obtained as follows:

4-hydroxy-6-methyl - 7H - pyrrolo[2,3-d]pyrimidine is heated with phosphorus oxychloride for 2 hours to give 4-chloro-6-methyl - 7H - pyrrolo[2,3-d]pyrimidine (from ethyl acetate prisms having a M.P. of 236–238°). The chloro compound is dehalogenated with hydrogen in ethanol, in the presence of a palladium catalyst (5% on charcoal), whereby 6-methyl-7H-pyrrolo[2,3 - d]pyrimidine (from ethyl acetate prisms having a M.P. of 214–216°), is obtained and is heated to 50° with dimethylamine hydrochloride, formalin and sodium acetate in water for 2 hours to give 5-dimethylaminomethyl-6-methyl-7H-pyrrolo[2,3-d]pyrimidine; rodlets having a M.P. of 145–149° from chloroform/ether. This yields 5-cyanomethyl-7H-pyrrolo[2,3-d]pyrimidine (from ethyl acetate rodlets having a M.P. of 232–234°) by heating for 20 minutes with sodium cyanide in dilute hydrochloric acid.

EXAMPLE 2

Galenic preparation: tablets

| | G. |
|---|---|
| 5-amidinomethyl-6-methyl - 7H - pyrrolo[2,3-d] pyrimidine dihydrochloride | [1] 0.0274 |
| Magnesium stearate | 0.0010 |
| Polyvinyl pyrrolidone | 0.0040 |
| Talc | 0.0080 |
| Maize starch | 0.0100 |
| Lactose | 0.1476 |
| Dimethyl silicone oil | 0.0005 |
| Polyethylene glycol 6000 | 0.0015 |
| For a tablet of | 0.2000 |

[1] Corresponds to 20 mg. of the free base.

What is claimed is:

1. Compounds of the formula:

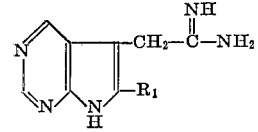

wherein $R_1$ is hydrogen or methyl, and pharmaceutically acceptable acid addition salts thereof.

2. The compound of claim 1, which is 5-amidinomethyl-6-methyl-7H-pyrrolo[2,3-d]pyrimidine.

References Cited

UNITED STATES PATENTS 3,311,628   3/1967   Partyka _____ 260—256.4

ALEX MAZEL, Primary Examiner

R. V. RUSH, Assistant Examiner

U.S. Cl. X.R.

424—251